3,265,726
ORGANIC BORON AND NITROGEN
CONTAINING COMPOUNDS
Joseph Green and Nathan Mayes, Dover, N.J., assignors to Thiokol Chemical Corporation, Bristol, Pa., a corporation of Delaware
No Drawing. Filed Sept. 29, 1960, Ser. No. 59,459
7 Claims. (Cl. 260—465.9)

This invention relates to organoboron copolymers and to a method for their preparation. The organoboron copolymers are prepared by the reaction of an unsaturated nitrile, having from 3 to 9 carbon atoms with a compound of the class

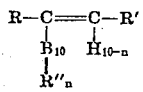

wherein R and R' are each hydrogen, alkyl radicals, or alkenyl radicals, at least one of R and R' being an alkenyl radical and the total number of carbon atoms in R and R' being from 0 to 8, R'' is a lower alkyl, and $n$ varies from 0 to 4, while the reactants are in admixture with a catalytic amount of an initiator for vinyl-type polymerizations.

Compounds of the above class can be prepared by the method described in application Serial No. 59,460, filed September 29, 1960, of Bobinski et al. For example, C-isopropenylvinylenedecaborane of the formula

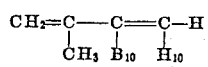

can be prepared by heating isopropenyl acetylene with bis(acetonitrile) decaborane in benzene at reflux for 24 hours.

Suitable nitriles include acrylonitrile, crotononitrile, allyl cyanide, α-methylacrylonitrile, maleonitrile, fumaronitrile, 2-, 3-, and 4-penteneonitrile, methallyl cyanide, α-ethylacrylonitrile 2-, 3-, and 5-hexenonitrile, 3- and 4-heptenonitrile, B-t-butylacrylonitrile, 3-octenonitrile and diethylallylacetonitrile.

The free-radical initiators for vinyl-type polymerizations are well known and include the organic peroxide type and the azo type. Thus there can be employed in the process of the present invention organic peroxides such as for example, acetyl benzoyl peroxide, peracetic acid, hydroxyheptyl peroxide, isopropyl percarbonate, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, t-butyl permaleic acid, t-butyl perbenzoate, di-t-butyl diperphthalate, t-butyl perphthalic acid, p-chlorobenzoyl peroxide, t-butyl peroxide, dibenzal diperoxide and azo compounds such as, for example, azobisisobutyronitrile, azobisphenylethane, p-bromobenzenediazo hydroxide, triphenylmethylazobenzene, and diazoaminobenzene. Other suitable free-radical initiators for vinyl-type polymerizations include N-nitrosoacylanilides and benzyl hyponitrite.

The ratio of reactants can be varied widely, generally being in the range of 0.5 to 2 moles of nitrile per mole of organoboron compound, preferably 1 to 1. The ratio of initiator to organoboron compound can also be varied widely, generally being in the range of 0.001 to 0.10 mole of initiator per mole of organoboron compounds, preferably 1 to 100. The reaction temperature can vary from 25° C. to 150° C. and the pressure can vary from subatmospheric to several atmospheres. The reaction to go to completion generally requires about 24 to 72 hours depending upon the ratio of reactants, the particular reactants and initiator used, and the temperatures and pressure employed.

The process of the invention is illustrated in detail by the following examples.

*Example I*

5.0 grams (0.027 mole) of C-isopropenylvinylene-decaborane of the formula

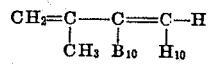

2.5 grams (0.047 mole) of acrylonitrile and 0.025 gram of azobisisobutyronitrile were heated in an evacuated, sealed glass tube at 75° C. for 88 hours. The solution had then become a soft gel. The seal was broken and the tube contents were placed in about 50 milliliters of n-heptane and stirred. The mixture was filtered and 0.91 gram of heptane insoluble solids were obtained. The solids softened at about 195° C., dissolved in dimethylformamide and in warm adiponitrile, and analyzed 16.0% N and 12% B.

*Example II*

1.0 gram (0.005 mole) of C-isopropenylvinylene-decaborane, 0.5 gram (0.01 mole) of acrylonitrile, and 0.005 gram of azobisisobutyronitrile were heated in an evacuated, sealed glass tube at 70° C. for 60 hours. A small quantity of solid had precipitated. The seal was broken and the tube contents were filtered. The solid softened at 190°–200° C. and an infrared spectrum showed BH, C≡N, C—CH$_3$, and trace C═C absorptions. The filtrate was placed in about 20 milliliters of n-heptane and a white precipitate formed. This white precipitate was separated by filtration and the separated white solids softened at 154–160° C. and analyzed 26.5% B. The infrared spectra of both solids were essentially the same.

The boron containing solid materials produced by practicing the methods of this invention, can be employed as ingredients of solid propellant composition in accordance with general procedures which are well understood in the art, inasmuch as the solids produced are readily oxidized using conventional solid oxidizers such as ammonium perchlorate, potassium perchlorate, sodium perchlorate and the like. In formulating a solid propellant composition employing one of the materials produced in accordance with the present invention, generally from 5 to 35 parts by weight of boron containing material and from 65 to 95 parts by weight of oxidizer are present in the final propellant composition. In the propellant, the oxidizer and the product of the present process are formulated in intimate admixture with each other, as by finely dividing each of the materials separately and thereafter intimately mixing them. The purpose of doing this, as the art is well aware, is to provide proper burning characteristics of the final propellant. In addition to the oxidizer and the oxidizable material, the final propellant can also contain an artificial resin generally of the urea-formaldehyde or phenolformaldehyde type, the function of the resin being to give the propellant mechanical strength and at the same time improve its burning characteristics. Thus, in manufacturing a suitable propellant, proper proportions of finely divided oxidizer and finely divided boron containing material can be admixed with a high solids content solution of partially condensed urea-formaldehyde or phenol-formaldehyde resin, the proportions being such that the amount of resin is about 5 to 10 percent by weight based on the weight of oxidizer and boron compound. The ingredients are thoroughly mixed with the simultaneous removal of solvent, and following this the solvent free mixture is molded into the desired shape, as by extrusion. Thereafter the resin can be cured by resorting to heating at moderate temperatures. For further information concerning the formulation of solid propellant compositions, a reference is made to U.S. Patent 2,622,277 to Bonnell and U.S. Patent 2,646,596 to Thomas.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

We claim:

1. A method for the preparation of organoboron copolymers which comprises reacting an unsubtituted, unsaturated nitrile of a carboxylic acid containing an ethylenic linkage selected from the group consisting of monocarboxylic and discarboxylic acids having from 3 to 9 carbon atoms with a compound of the class

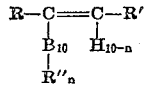

wherein R and R' are each selected from the class consisting of hydrogen, alkyl radicals and alkenyl radicals, at least one R and R' being an alkenyl radical and the total number of carbon atoms in R and R' being from 2 to 8, R'' is a lower alkyl radical, and $n$ varies from 0 to 4, while the reactants are in admixture with a catalytic amount of a free radical initiator for vinyl polymerizations.

2. The method of claim 1 wherein the nitrile is acrylonitrile.

3. The method of claim 1 wherein the said compound is C-isopropenylvinylenedecaborane of the formula

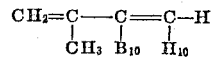

4. The method of claim 1 wherein the initiator is azobisisobutyronitrile.

5. The method of claim 1 wherein the nitrile is acrylonitrile, wherein the said compound is C-isopropenylvinylenedecaborane of the formula

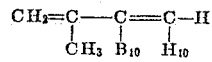

and wherein the initiator is azobisisobutyronitrile.

6. Organoboron copolymers produced by the method of claim 1.

7. Organoboron copolymers produced by the method of claim 5.

No references cited.

CHARLES B. PARKER, *Primary Examiner.*

LEON D. ROSDOL, CARL D. QUARFORTH,
*Examiners.*

J. W. WHISLER, L. A. SEBASTIAN, J. P. BRUST,
*Assistant Examiners.*